US006895589B2

United States Patent
Bermudez et al.

(10) Patent No.: US 6,895,589 B2
(45) Date of Patent: May 17, 2005

(54) MANAGER COMPONENT FOR MANAGING INPUT FROM EXISTING SERIAL DEVICES AND ADDED SERIAL AND NON-SERIAL DEVICES IN A SIMILAR MANNER

(75) Inventors: Gerardo Bermudez, Redmond, WA (US); Hirofumi Yamamoto, Redmond, WA (US); Jason A. Schroeder, Redmond, WA (US); Firdosh K. Bhesania, Kirkland, WA (US); Jay Senior, Redmond, WA (US); Doron J. Holan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 09/681,782

(22) Filed: Jun. 4, 2001

(65) Prior Publication Data

US 2001/0052033 A1 Dec. 13, 2001

Related U.S. Application Data

(60) Provisional application No. 60/211,007, filed on Jun. 12, 2000.

(51) Int. Cl.[7] .............................................. G06F 13/10
(52) U.S. Cl. ........................................ 719/321; 719/327
(58) Field of Search ................................. 719/321–327, 719/311–317

(56) References Cited

U.S. PATENT DOCUMENTS 5,991,546 A * 11/1999 Chan et al. ................... 710/62
6,081,855 A *  6/2000 deCarmo ...................... 710/62
6,643,721 B1 * 11/2003 Sun ............................. 710/62

* cited by examiner

Primary Examiner—John Follansbee
Assistant Examiner—Haresh Patel
(74) Attorney, Agent, or Firm—Shook, Hardy & Bacon, L.L.P.

(57) ABSTRACT

A manager component for managing input from legacy and non-legacy devices in a similar manner is disclosed. An inventive manager component receives input from both non-legacy input drivers for non-legacy input devices, and legacy input drivers for legacy input devices. The manager component provides the input to application programs that desirably have previously registered to receive input from one or more types of input devices. The application programs receive this input without directly communicating with the drivers.

15 Claims, 11 Drawing Sheets

DEVICE REMOVAL FIG 2(d)

MANAGER COMPONENT FOR MANAGING INPUT FROM EXISTING SERIAL DEVICES AND ADDED SERIAL AND NON-SERIAL DEVICES IN A SIMILAR MANNER

CROSS REFERENCE TO RELATED APPLICATIONS

This patent application is related to, and claims benefit and priority of, the previously filed provisional patent application entitled "Incorporation of Generic Input and Window Manager," which was filed on Jun. 12, 2000, and assigned Ser. No. 60/211,007.

BACKGROUND OF INVENTION

This invention relates generally to input from legacy devices, such as pointing devices and keyboards, and non-legacy Human Input Devices (HID's), such as devices having Universal Serial Bus (USB) connectivity, IEEE-1394 connectivity, or another type of connectivity. More particularly, the invention relates to managing input from both such devices in a similar manner to provide to application programs.

Historically, the primary input devices for computers have been a keyboard and a pointing device, the latter typically being a mouse. Within a graphical user interface, the mouse is used to navigate a cursor, such as a pointer, on the screen. When a cursor is positioned over a desired graphical user interface element, such as a window or a button, one or more different pointing device buttons can be actuated to select the element. For example, pressing the left pointing device button over a button displayed on the screen causes the button to be selected in some operating systems. The keyboard, which has been a primary input device for computers even longer than the pointing device, is used mainly for achieving text entry.

Keyboards and pointing devices have traditionally connected to serial ports on the back of computers. These serial ports may be general-purpose serial ports, but more usually they are special-purpose serial ports, in that there is one serial port dedicated to the keyboard, and another for the pointing device. While serial ports come in many different form factors, currently the most popular form factor is known as PS/2, such that keyboards and pointing devices are said to have PS/2 connectors. Because of the ubiquity and long-term use of such keyboards and pointing devices, they are referred to as legacy devices.

Legacy devices are devices that, because of their ubiquity and long-term use in the industry, generally always are supported by operating systems and application programs. Most operating systems, for example, assume that a keyboard and a pointing device is connected to the computer on which they are running for the user to provide input. There are very few, if any, modern operating systems and application programs that do not assume the presence of a keyboard and a pointing device for providing input to the computer. To this extent, driver programs have been written especially for keyboards and pointing devices, and application programs have grown accustomed to dealing with keyboards and pointing devices in a usual way.

However, more recently, other types of input devices have become popular. Generally, these types of input devices are referred to as non-legacy devices. They are non-legacy devices because they are newer than legacy devices, and are not always supported by operating systems and application programs. As a class of devices, they are non-legacy input devices referred to as Human Interface Devices (HID's).

Typically, non-legacy devices use a newer connector than the serial ports that are ubiquitous with PS/2-type keyboards and pointing devices. For example, they may have Universal Serial Bus (USB) connectivity, or IEEE-1394 connectivity, which is also referred to as FireWire or iLink connectivity. Paradoxically, such non-legacy devices may still include keyboards and pointing devices, but where the keyboards and pointing devices have a USB, IEEE-1934, or another type of connector, instead of a PS/2 connector. Other non-legacy devices include wheels, such as are found on pointing devices, touch-sensitive pads for achieving handwriting input, game controllers, and other types of input devices.

Because of the increasing number of such non-legacy input devices, operating systems and application programs have a difficult time accommodating them. The typical paradigm for managing input from non-legacy input devices is for the application programs to directly communicate with the device drivers for such devices. This is as opposed to how application programs communicate with legacy input devices, where they usually receive input therefrom through a manager component of the operating system. Unfortunately, current state of the art is such that, to accommodate new non-legacy input devices, operating systems have to be revised, where only a new version of an operating system can accommodate a new device. This is problematic for application programs desiring to use the new devices in the context of older versions of the operating systems, because they must then manage input from the drivers themselves, instead of relying on the operating system. This adds complexity to the development of application programs, as well as increased overhead not well suited for application programs.

Figure 1:
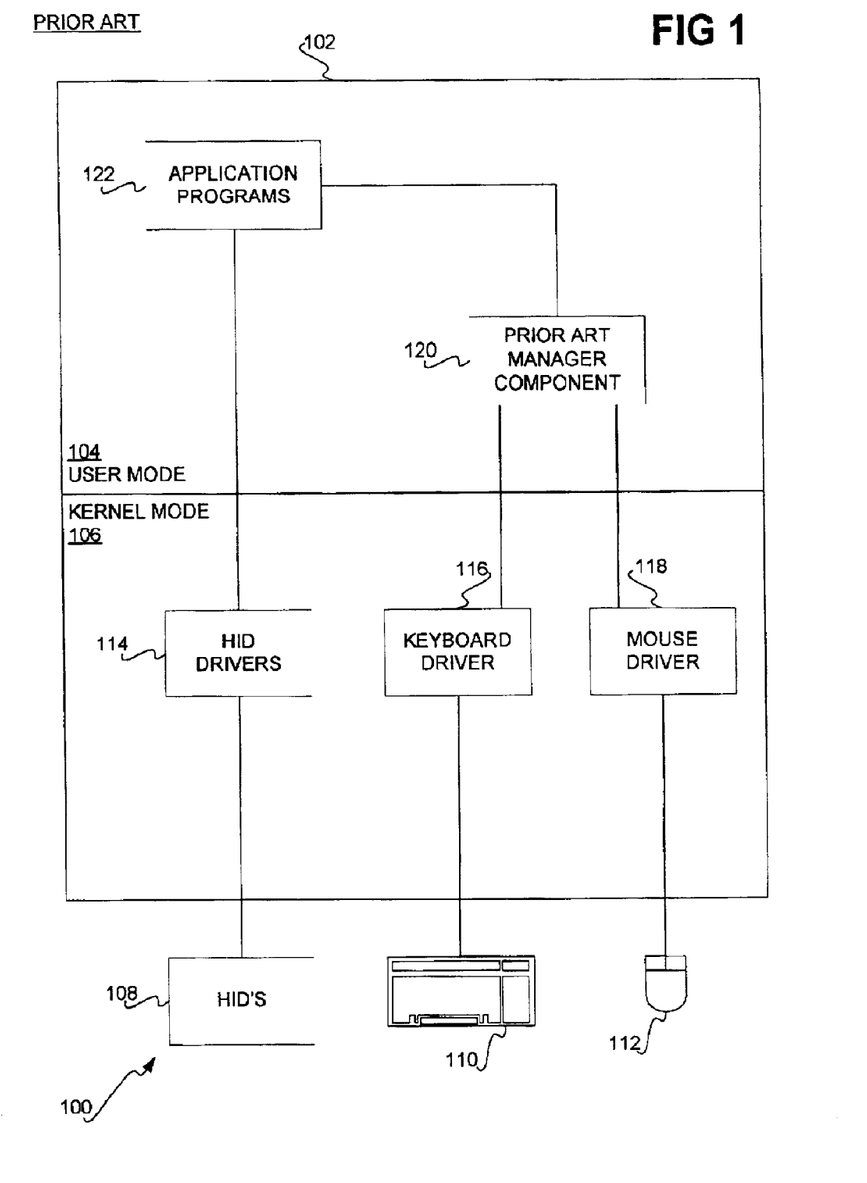
FIG. 1 is a diagram of a system showing how the prior art manages input from legacy input devices and non-legacy input devices in dissimilar ways.

The diagram of FIG. 1 illustrates a prior art system 100 in which the divergent approach for managing non-legacy devices is shown. The operating system environment 102 includes memory divided into a user mode 104 and a kernal mode 106. The kernel mode 106 is the specially protected part of the operating system's memory that is inhabited by special programs like the drivers 114, 116, and 118. Conversely, the user model 104 is the general part of the operating system's memory in which the application programs 122 reside, as well as some parts of the operating system itself, such as the prior art manager component 120.

As shown in FIG. 1, the keyboard 110 and the mouse 112 send input to the prior art manager component 120 through the keyboard driver 116 and the mouse driver 118, respectively. The prior art manager component 120 is the established mechanism for handling input from legacy devices such as the keyboard 110 and the mouse 112. The application programs 122 have come to rely on the existence of the manager component 120 as the way by which they receive keyboard and mouse input. The prior art manager component 120 itself includes the necessary overhead for communicating with the legacy device drivers 116 and 118, such that the application programs 122 do not have to concern themselves with this overhead.

Conversely, non-legacy devices, such as the HID's 108, do not send input to the prior art manager component 120 through their drivers 114. Instead, the application programs 122 must directly interface with the HID drivers 114 to receive input from the non-legacy devices. This means that the overhead necessary for learning of new non-legacy devices that are plugged in while the computer is running, as is allowed, for example, with USB and IEEE-1394 devices, must be handled by the application programs 122 themselves. Each of the application programs 122 must be developed to accommodate this overhead. Furthermore, when more than one of the application programs 122 tries to receive input from the same one of the devices 108, problems may arise. This is because some of the application programs 122 may be developed such that they do not count on other of the programs 122 attempting to receive input from the same device. Whereas the prior art manager component 120 manages this situation for legacy devices, it does not for non-legacy devices.

For the reasons described here, therefore, as well as for other reasons, there is a need for the present invention.

SUMMARY OF INVENTION

The invention relates to a manager component for managing input from both legacy and non-legacy input devices in a similar manner. An inventive manager component receives input from both non-legacy input drivers for non-legacy input devices, and legacy input drivers for legacy input devices. The manager component provides the input to application programs that desirably have previously registered to receive input from one or more types of input devices. The application programs receive this input without directly communicating with the drivers.

The inventive manager component can provide the input from the non-legacy input drivers according to a pre-existing manner in which the application programs had previously received only the input from the legacy input drivers. In this way, the manager component leverages the pre-existing manner for providing the input from the legacy input drivers. The application programs are spared from having to manage the overhead for receiving input from non-legacy input devices. The inventive manager component can provide the input from both the non-legacy and the legacy input drivers such that the application programs receive the input from both types of drivers in an integrated, identical manner. New non-legacy input devices can be added to the system without requiring revision of the manager component, the operating system, or the application programs.

Besides those described in this summary, other aspects, embodiments, and advantages of the invention, will become apparently by reading the detailed description of the invention, and by referencing the accompanying drawings.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Integrated Manner for Managing Input from Legacy and Non-Legacy Input Devices

Figure 2A:
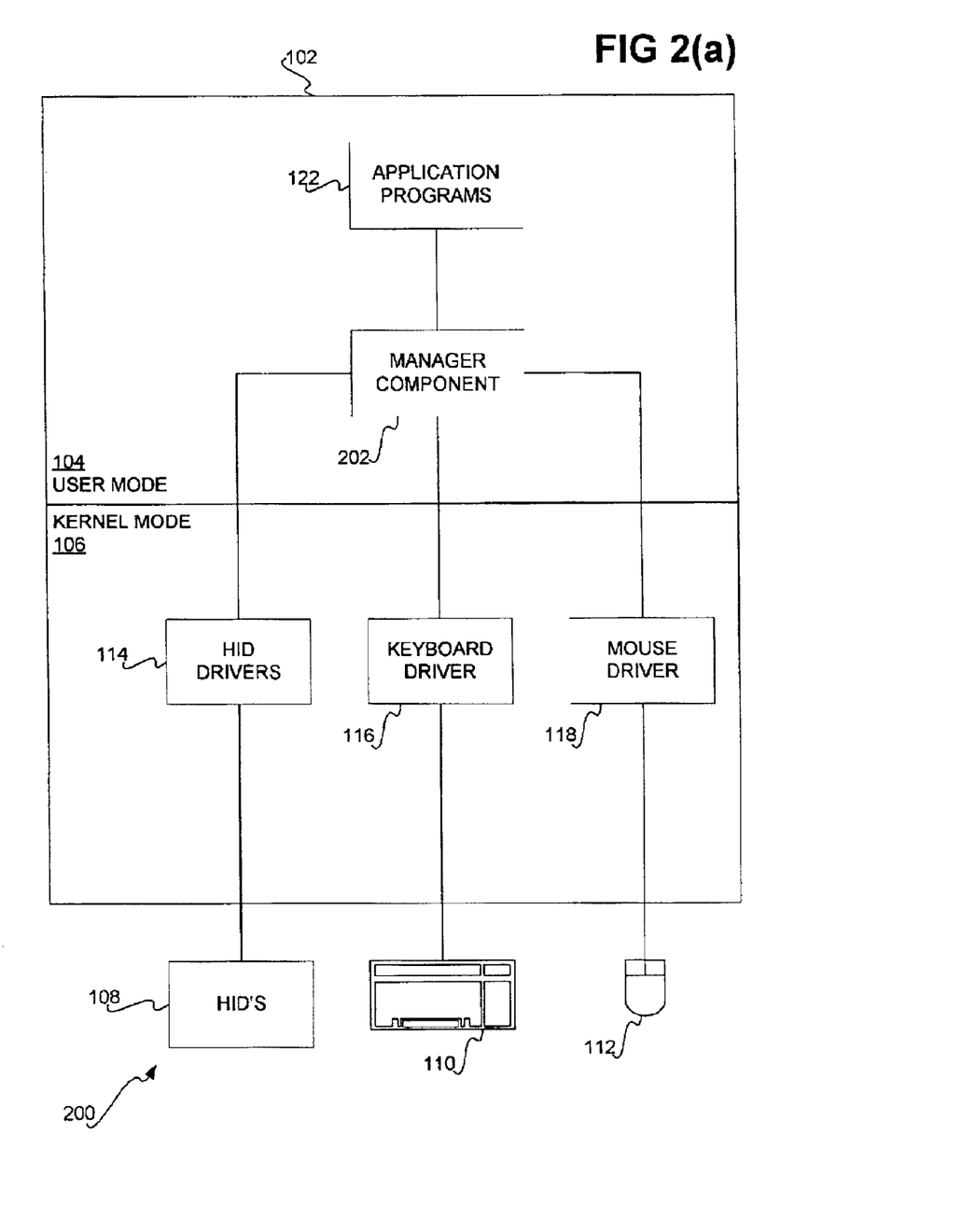
FIG. 2(a) is a diagram of a system showing how the invention manages input from legacy input devices and non-legacy input devices in a similar way.

FIG. 2(a) shows a diagram 200 illustrating the integrated manner for managing input from legacy and non-legacy input devices. The operating system environment 102 includes memory divided into the user mode 104 and the kernal mode 106. The non-legacy input devices 108, also referred to as human input devices (HID's), send their input to the non-legacy device drivers 114. Conversely, the legacy devices 110 and 112, specifically a keyboard and a pointing device, such as a mouse, respectively, send their input to the legacy drivers 116 and 118. The inventive manager component 202 receives the input from the non-legacy device drivers 114, as well as the legacy device drivers 116 and 118. The component 202 manages this input, and provides the input to the application programs 122. The component 202 provides the input to the application programs 122 in a similar way, regardless of whether the input is from the non-legacy devices 108, or the legacy devices 110 and 112.

The input is sent from the manager component 202 to the application programs 122 as an input message. The input message allows the sending of raw data from the non-legacy devices 108 and the legacy devices 110 and 112 to the application programs 122. Raw data is data that is received from the devices 108,110, and 112 that has not been translated after receipt. The input message used to send input is preferably a pre-existing manner by which input from the legacy devices 110 and 112 were sent to the application programs 122. The invention leverages this pre-existing manner to also send messages regarding input from the non-legacy devices 108 to the application programs 108. That is, messages regarding input from the non-legacy devices 108 are sent in the same way as messages regarding input from the legacy devices 110 and 112. The application programs 122 thus receive input from the non-legacy devices 108 without directly communicating with the non-legacy device drivers 114.

In order to receive messages from a type of device, the application programs 122 initially register as to the type of input device from which they wish to receive input. The registration process is shown as the method 250 of FIG. 2(b). The registration process is performed by the manager component 202. First, it is determined whether a given application program, or more specifically a particular process of an application program, has already registered for receiving messages (252). An application program can include one or more different processes, where each process is a part of the application program. If the process has not yet registered for receiving messages, then registration is enabled for the process (254).

Figure 2B:
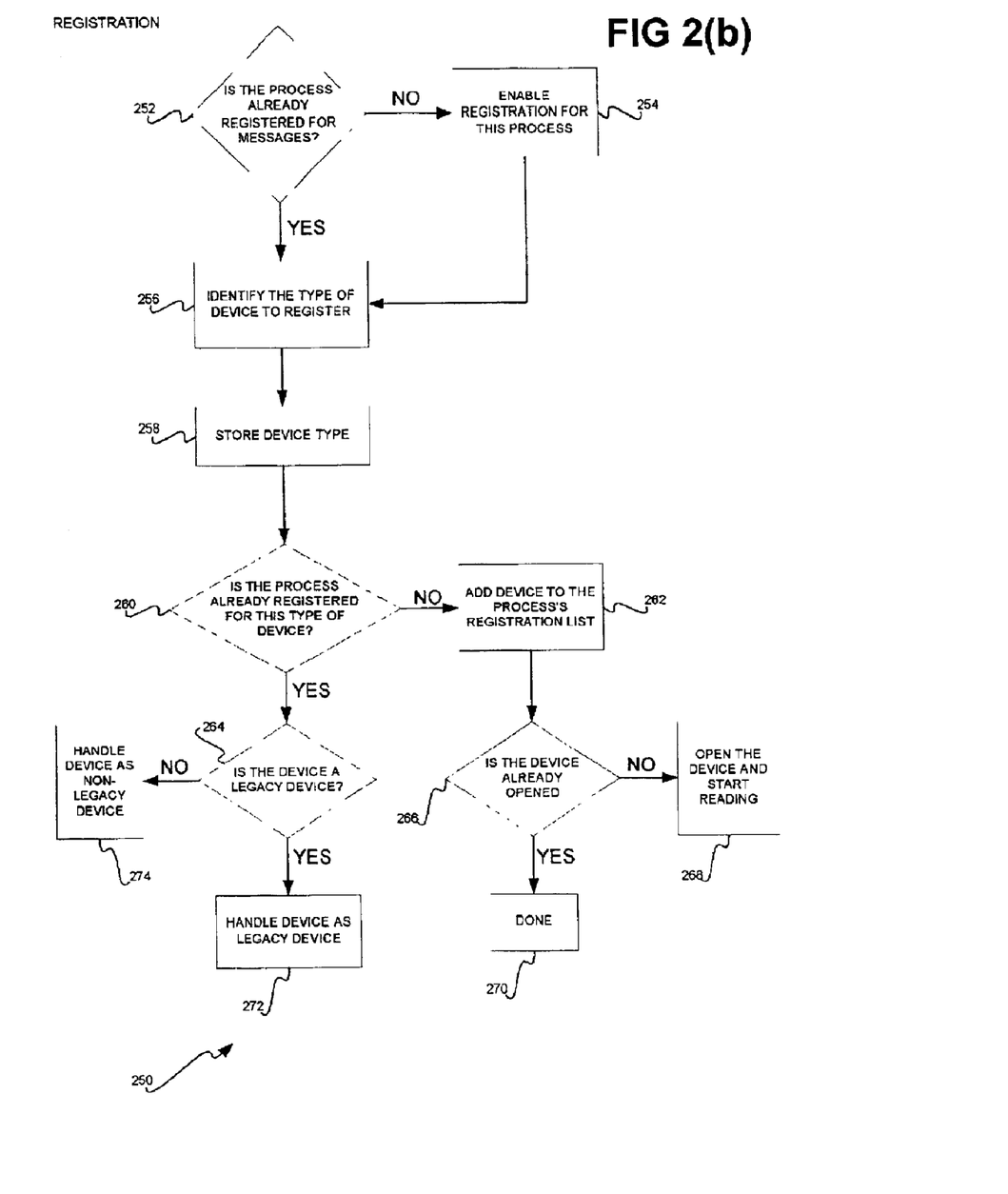
FIG. 2(b) is a flowchart of a method showing how one embodiment enables application programs to register for receiving input from devices.

Next, the type of device that the application program wishes to register for is identified (256), and this device type is stored (258). The type of device that the application wishes to register for in 256 is also referred to as the top-level collection, where the top-level collection identifies a type of human input device based on the usage page and usage identified in the report descriptor. The device type is stored in 256 within a global device request list, for example, as well as a per-process request list. The global device request list is a list of all the devices that have been requested by processes of application programs. The per-process request list is a similar list, but is specific to a given process as to the devices that have been requested by that process.

If the process is already registered for this type of device (260), then the specific device that the process is registering is identified as a legacy device or a non-legacy device (264). If the device is a non-legacy device, then the device is handled as a non-legacy device (274). Any parameters associated with the registration for this device are updated accordingly. If the device is a legacy device, then the device is handled as a legacy device (272). Any flags associated with the registration for this device are updated accordingly.

If the process is not already registered for this type of device (260), then the device is added to the registration list of devices for the process (262). It is then determined whether the device is already open for receiving input from the device (266). If not, the device is opened, and input is received from the device (268). If the device is already open, then the method 250 is finished (270).

For registration purposes, each device, whether a legacy device or a non-legacy device, can have a particular data structure that allows the user to select a device type, or top-level collection. An example of such a structure is:

typedef struct { USHORT usUsagePage;
//Usage page from the HID Usage Table USHORT usUsage;
//Top level usage from the HID Usage Table DWORD dwFlags;
//Flags} RAWINPUTDEVICE, *PRAWINPUTDEVICE;
typedef CONST RAWINPUTDEVICE* PCRAWINPUTDEVICE;

The flags in this structure can be set to one of the following four choices
:#define RIDEV_ADD_OR_MODIFY 0x00000000
define RIDEV_REMOVE 0x00000001 #define RIDEV_PAGEONLY0x00000020
define RIDEV_EXCLUDE0x00000010 #define RIDEV_NOLEGACY0x00000030

The first flag is the default option. If this flag is set, the operating system starts sending raw input from devices of the specific device type, or top-level collection, to the registered application program as long as the application program has window focus. The second flag is used to remove a device type, or top-level collection, from the list of registered devices for a process. It is used to indicate to the operating system to stop reading from a device that matches the device type. The third flag is used to inform the operating system that the application program wishes to listen to all devices having a device type, or top-level collection, off a specified page. The fourth flag is used in conjunction with the third flag, to specify particular top-level collections when reading a complete usage page. The last flag is used to block data from keyboard devices, mouse devices, and other legacy devices.

For the registration process of FIG. 2(b), an application program initially creates an array of raw input devices that includes the device types, or top-level collections, from which the application wishes to receive input. Once an application program has constructed this array, it then registers itself for these device types. This is accomplished by following the process of FIG. 2(b).

After registration, an application program receives input messages from devices that have a device type that matches the device type that has been registered. Two different types of approaches can be followed for a process of an application program to receive raw input data from a device: a buffered read approach, and a regular read approach. The buffered read approach allows an application program to receive a number of raw input data from the input device at the same time. Conversely, the regular read approach allows an application program to receive a single raw input data from the input device.

For the buffered read approach, when a process of an application program receives raw input, a status flag is set. The process then knows to call a function to retrieve the raw input. An application programming interface (API) for such a function is:

WINUSERAPIUINTWINAPIGetRawInputBuffer
(PRAWINPUT pRawInput, PUINT pcbsize);

pRawlnput is a pointer to an array of RawInput structures, whereas pcbSize refers to the size of pRawlnput in bytes. The function's return value indicates the number of Rawinput structures written to pRawinput. pRawlnput is an array of Rawinput, which has the following structure:

typedef
struct tagRAWINPUT { UINT cbsize;
DWORD dwType;
HANDLE hDevice;
ULONG_PTR ulReserved;
union { RAWMOUSE mouse;
RAWKEYBOARD keyboard;
RAWHID hid;
} data;
} RAWINPUT, *PRAWINPUT, *LPRAWINPUT;

Each Rawinput structure provides a handle to the device generating the information. This handle is provided to the function to obtain further information on the device. The Rawinput structure also provides an indication of the origin of the information, through the dwType variable. The variable can have the following values:
define RIM_TYPEMOUSE 0
define RIM_TYPEKEYBOARD 1
define RIM_TYPEHID 2

For the regular read approach, a different function may be called. This function operates similarly to the buffered read approach, but only a single raw input data is returned when called, instead of a collection of raw input data.

An application program may also call one of two other functions as desired. The first function determines the registration status for the input devices. The program calls this function to determine which input devices, of which device type, for which it already has registered. The second function provides information regarding the device generating the message.

Besides registering for a device type, an application program may also unregister a device type if it no longer wishes to receive input from devices of that type. The unregistration process is shown as the method 210 of FIG. 2(c). The method 210 is performed by the manager component 202. First, it is verified that the device is registered for the process (212). This can be accomplished by determining that the device is listed in what is referred to as the process's request table. If the device is not registered, then the method ends (214). Otherwise, it is determined whether the device to be unregistered is a legacy device (216). If so, unregistration for the device is handled as unregistration for a legacy device (218), such that flags for the legacy device are updated accordingly. For example, the flags are updated so that the process of the application program is no longer registered for the device.

Figure 2C:
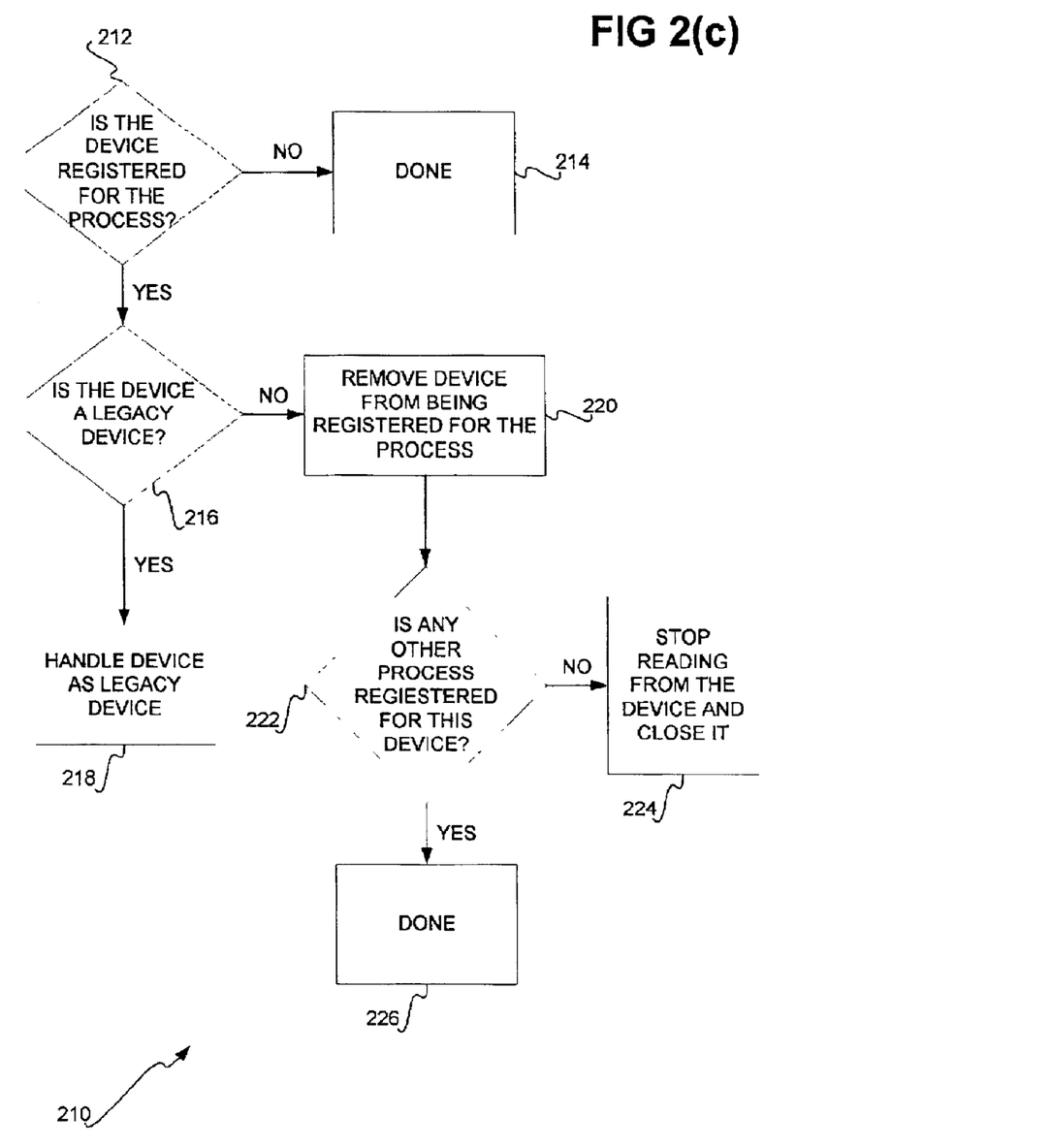
FIG. 2(c) is a flowchart of a method showing how one embodiment enables application programs to unregister devices from which they have previously registered to receive input.

If the device to be unregistered is a non-legacy device, then the device is removed as being registered for the process of the application program (220). This can include removing the device from the request table of the process. If any other processes are registered for this device (222), then the method 210 is finished (216). Otherwise, no more reading is accomplished from the device, and it is closed (224).

Devices may be able to be plugged into the computer and unplugged from the computer while the computer is on. This is referred to as "hot-plugging." In such instances, the manager component 202 should be able to accommodate the addition of a new device to the computer, as well as the removal of a device from the computer. The processes followed by the manager component 202 to manage the removal and addition of devices are shown as the method 230 of FIG. 2(d), and the method 280 of FIG. 2(e), respectively.

Figure 2D:
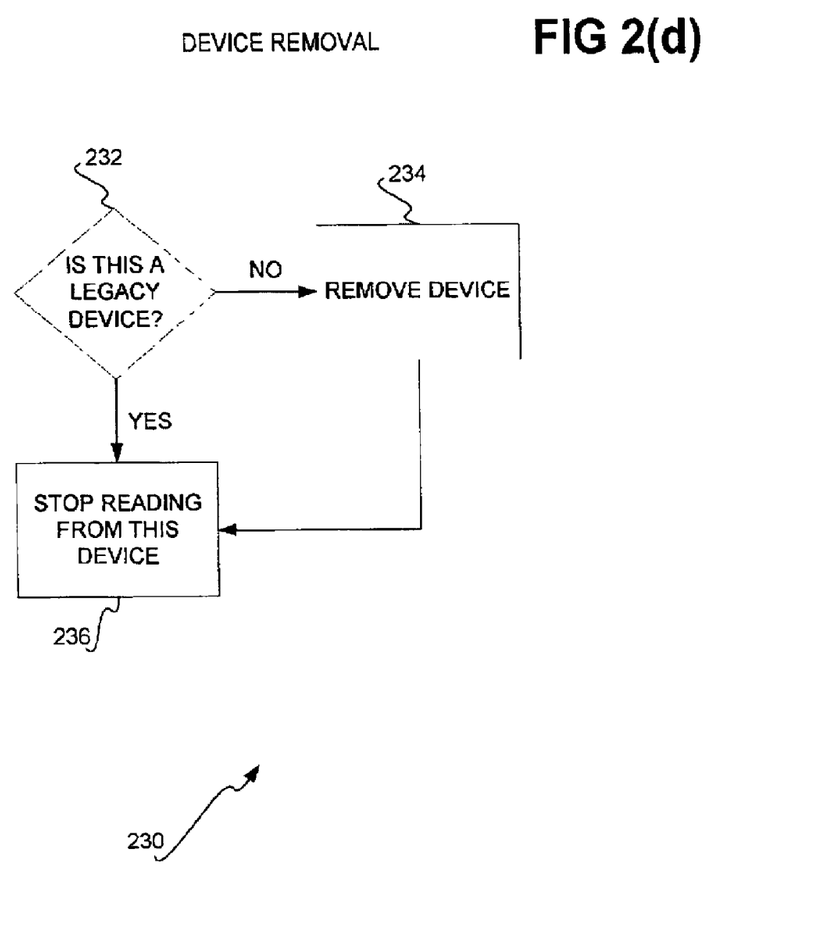
FIG. 2(d) is a flowchart of a method showing how one embodiment manages the physical removal of an input device.

For device removal, the method 230 of FIG. 2(d) first determines whether the device that has been removed is a legacy device (232). If not, then the device is removed as a device that can be registered by application program processes (234). For example, the device can be removed from the global device request list. Thereafter, the method 230 stops reading from the device (236), which is also accomplished in the case where the device that has been removed is a legacy device.

Figure 2E:
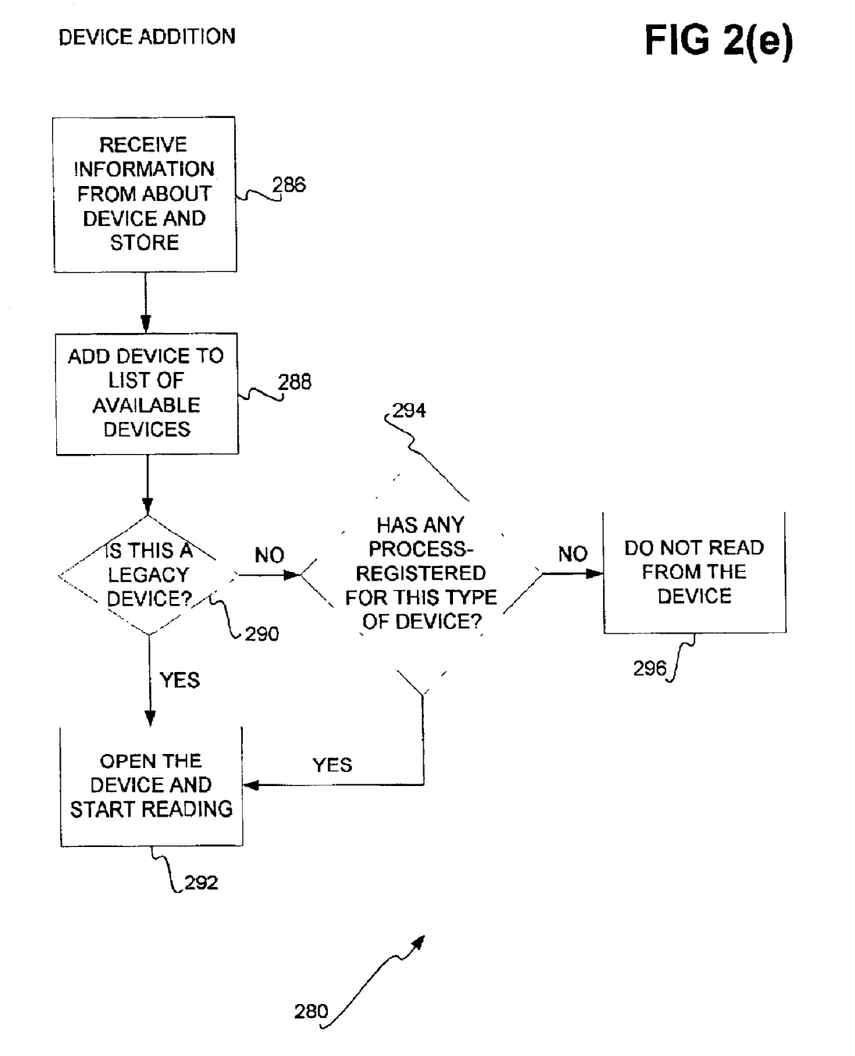
FIG. 2(e) is a flowchart of a method showing how one embodiment manages the physical addition of an input device.

For device addition, the method 280 of FIG. 2(e) first receives information regarding the device that has been added and stores this information (286). For example, the device is queried to receive information regarding the device. The device is added to the list of available devices that can be registered by application program processes (288). The information regarding the device, for example, may be added to the global device request list. If the device is a legacy device (290), then the device is opened and is read (292). If the device is a non-legacy device (290), then it is determined whether any process has previously registered for devices of this device type, or top-level collection (294). If so, then the device is opened and read (292). Otherwise, the device is not yet opened or read (296). The method 280 allows for new devices, and corresponding new device drivers, to be added without having to revise any of the application programs, or the manager component 202 of the operating system.

Figure 3:
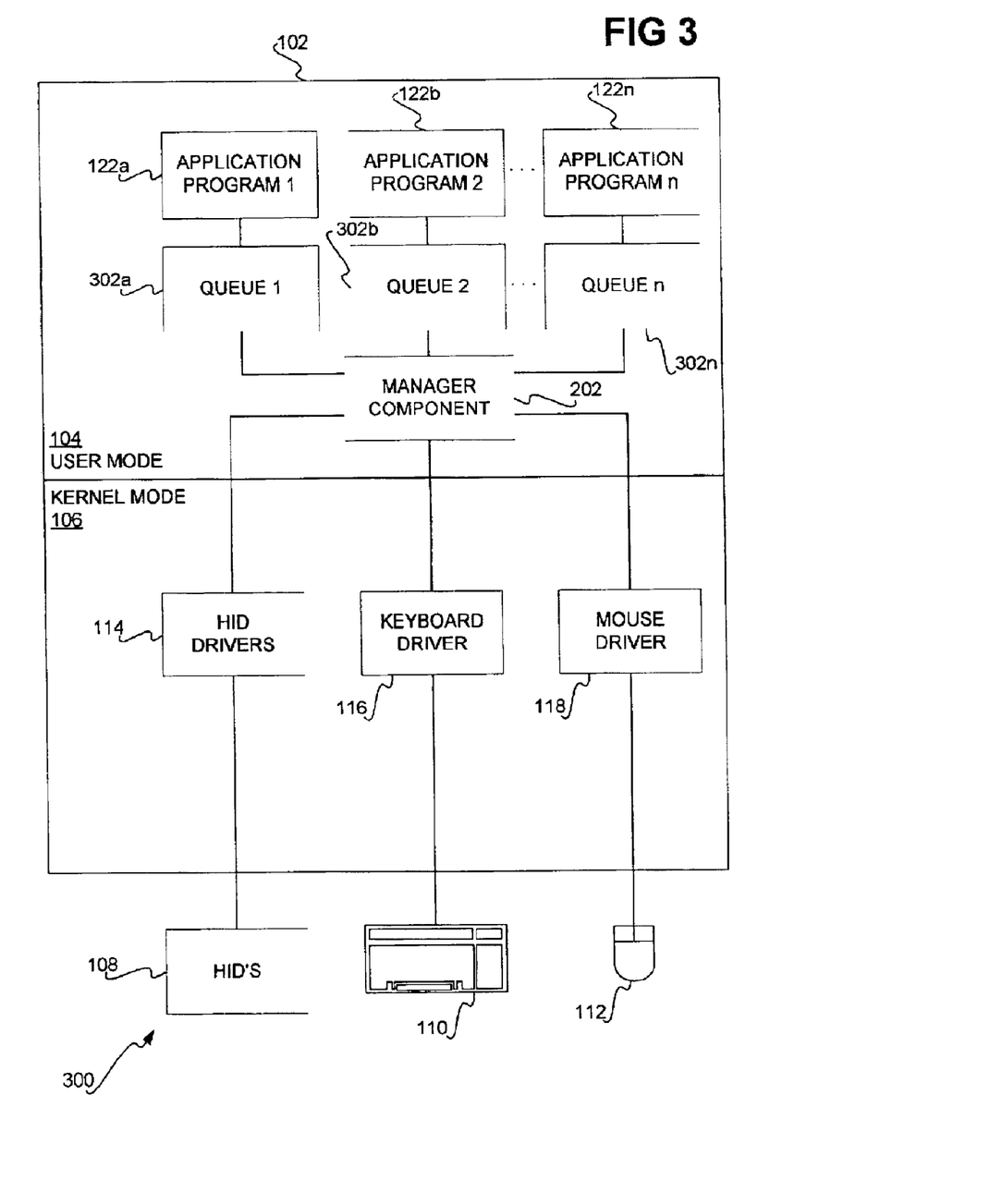
FIG. 3 is a diagram of a system showing an alternative embodiment of the system of FIG. 2(a) in which input queues for the application programs are present.

Each of the application programs 122 can have an associated input queue in which input data is placed by the manager component 202 for reading by the application program. This is shown in the diagram 300 of FIG. 3. The manager component 202 provides device input to the queues 302a, 302b, . . . , 302n for the application programs 122a, 122b, 122n, respectively. The device input is received from the input drivers 114, 116, and 118, which interact directly with the devices 108,110, and 112, respectively. Other than the presence of the queues 302a, 302b, . . . , 302n, the embodiment of FIG. 3 operates as the embodiment of FIG. 2(a) has been described.

Pre-Processors and Post-Processors

Figure 4A:
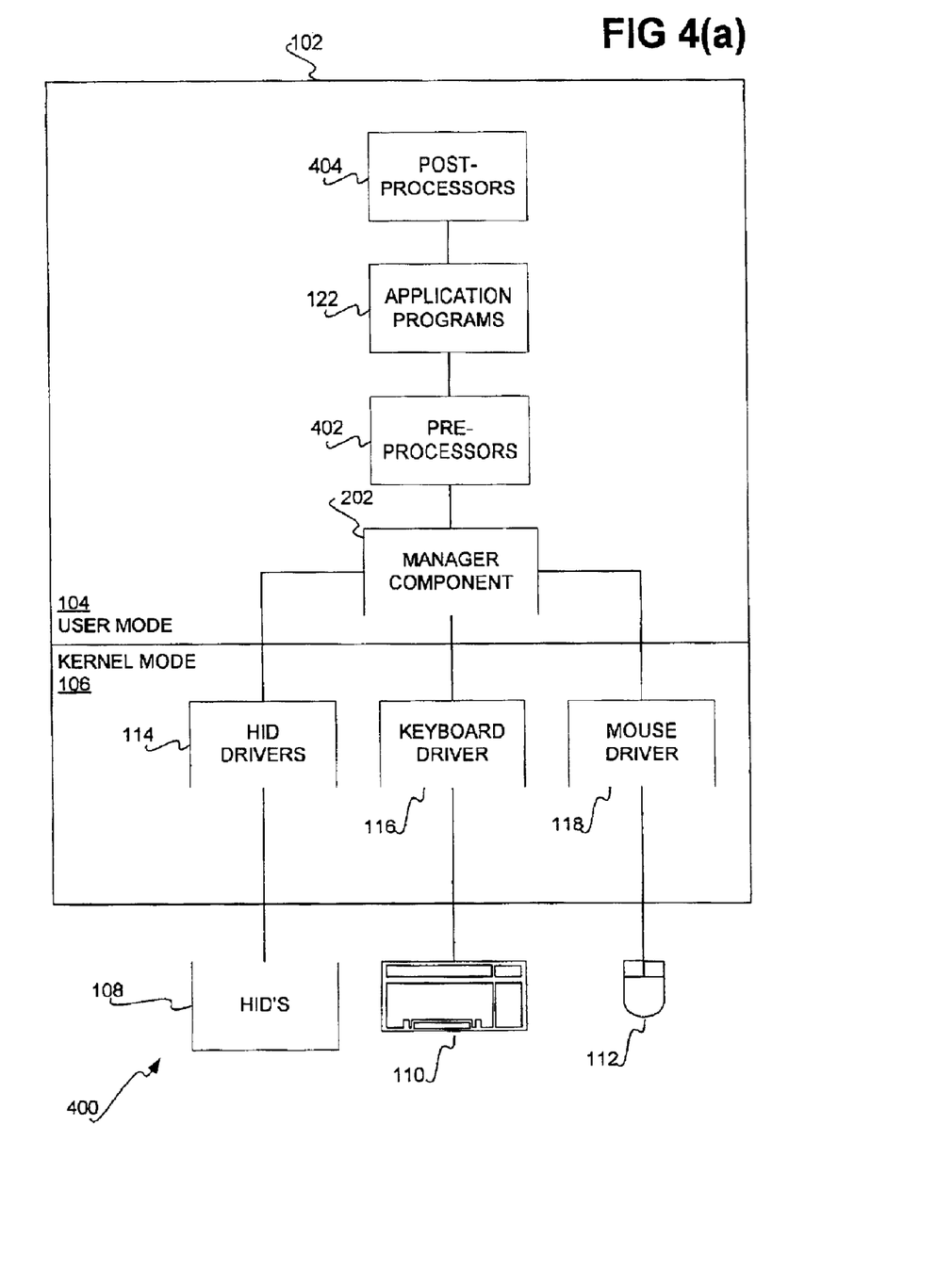
FIG. 4(a) is a diagram of a system showing an alternative embodiment of the system of FIG. 2(a) in which pre-processors and post-processors are present.

The input from the device drivers 114,116, and 118 has been described as being provided untranslated, or raw, to the application programs 122 by the manager component 402. However, pre-processors may be inserted between the manager component 402 and the application programs 122 to modify the input prior to its receipt by the application programs 122. This may be accomplished, for example, to have one type of device mimic another. Input from a joystick device, for instance, may be modified to mimic a mouse device. Similarly, post-processors may be inserted after the application programs 122 to modify the input after its receipt by the application programs 122.

Pre-processing and post-processing of the input from input devices is shown in the diagram 400 of FIG. 4(a). The pre-processors 402 are situated between the manager component 202 and the application programs 122. A given pre-processor may be specific to a type of device, a specific device, and/or a specific application program. The post-processors 404 are situated after the application programs 122. A given post-processor may also be specific to a type of device, a specific device, and/or a specific application program. Other than the presence of the pre-processors 402 and the post-processors 404, the embodiment of FIG. 4(a) operates as the embodiment of FIG. 2(a) has been described.

Figure 4B:
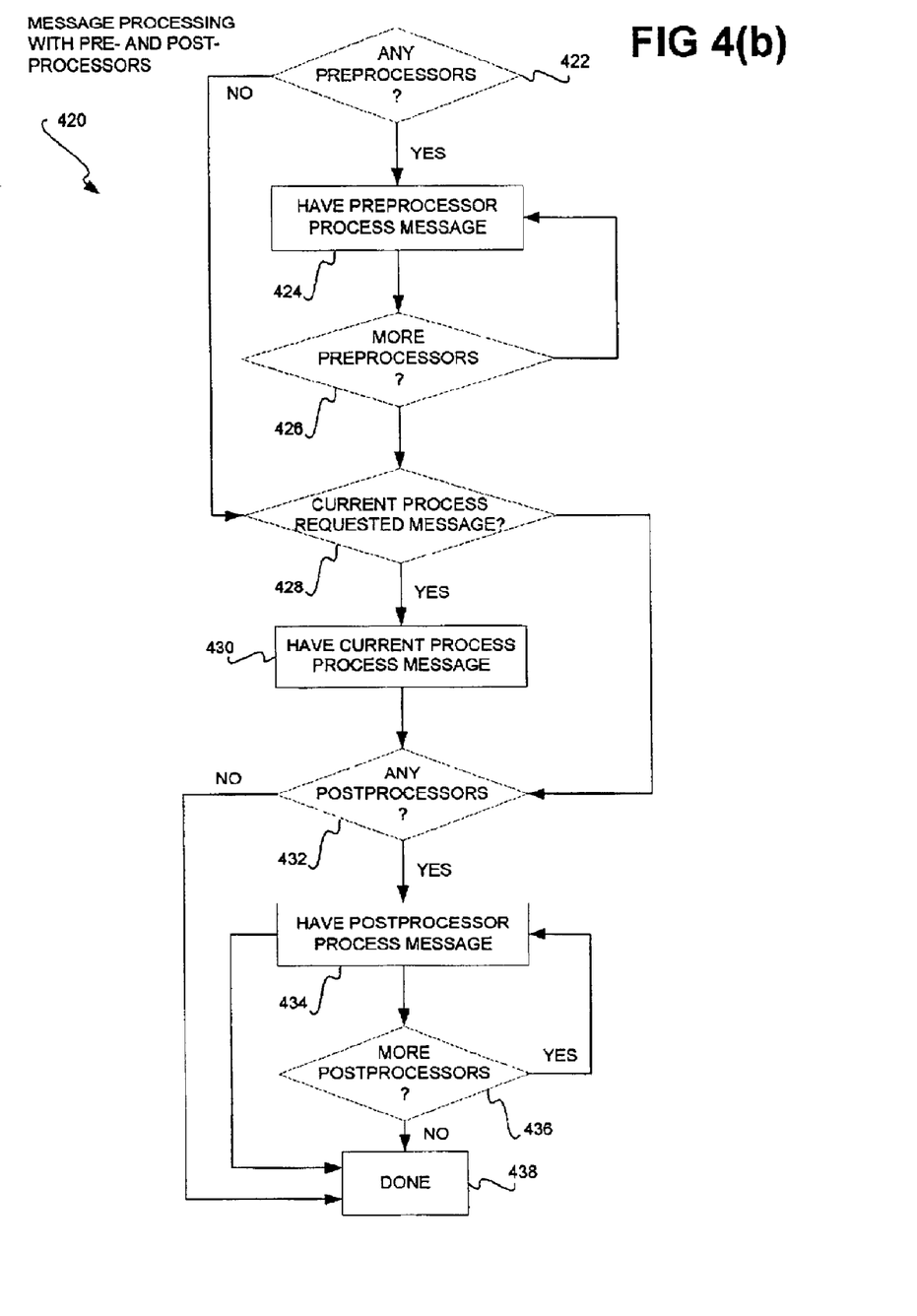
FIG. 4(b) is a flowchart of a method showing how one embodiment processes messages when pre-processors and/or post-processors are present, such as in conjunction with the alternative embodiment of FIG. 4(a).

FIG. 4(b) is a flowchart of a method 420 showing how one embodiment processes messages that are sent by the manager component 202 and intended for one or more of the application programs 122. The presence of pre-processors (422) causes processing of the message by a pre-processor (424). If there is more than one preprocessor (426), this process continues until each pre-processor has had an opportunity to process the message. Therefore, processing as performed by the preprocessors is accomplished sequentially, with the first pre-processor processing the message first, followed by the second pre-processor, and so on.

If there are no pre-processors (422), or once no more pre-processors need to process the message (426), then the method 420 determines whether the current process of the current application program has requested the message (428). The current process of the current application program is typically the process that currently is active, such that it has focus. If this process previously registered to receive messages from this type of device, then the process processes the message (430). Once this has been accomplished, or if the current process did not request the message via previous registration (428), then post-processing is accomplished by the post-processors, if any are present.

The presence of post-processors (432) causes processing of the message by a post-processor (434). If there is more than one post-processor (436), this process continues until each post-processor has had an opportunity to process the message. Similar to the case of pre-processors, processing as performed by the postprocessors is accomplished sequentially, with the first post-processor processing the message first, followed by the second post-processor, and so on. If there are no postprocessors (432), or once no more post-processors need to process the message (436), then the method 420 is finished (438).

Multiple Focus

Usually, the active application program of the programs 122 is the program that receives input from the devices 108, 110, and 112 through their respective drivers 114,116, and 118 via the manager component 202. In the context of a graphical user interface (GUI), this application program is the current foreground application program, such that the application program has focus. As the user calls up other application programs, or sends the current application program into the background, other application programs become the foreground application program, such that they have focus. These application programs can thus become the active application program that receives input from the input devices 108,110, and 112 via the manager component 202.

Alternatively, however, there are different types of focus. For example, a media application program may have media focus. This means that even if the media application program is not the active application program, it should receive input from media-related devices, such as compact disc (CD) players, multi-media keyboards, buttons on media speakers, and so on. As another example, a telephony application program may have telephony focus. This likewise means that even if the telephony application program is not the active application program, it still receives input from telephony-input devices.

Figure 5:
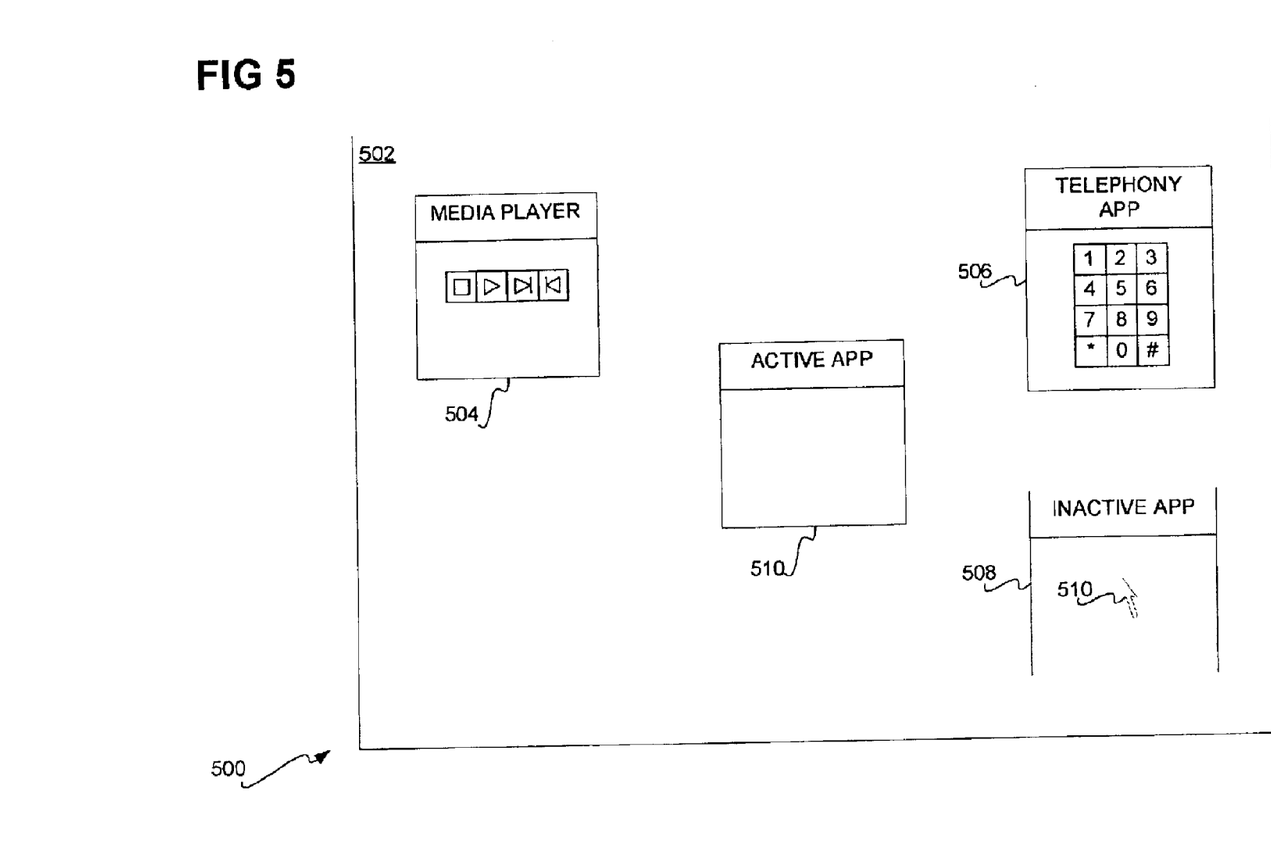
FIG. 5 is a diagram of a screen showing an alternative embodiment in which different application programs have different focus, such that they receive input from input devices even where they do not have active focus as the foreground application program.

FIG. 5 shows a diagram 500 of a screen 502 illustrating a number of different application programs within a GUI that have different focus. There are four windows on the screen 502, each associated with a different application program. The media window 504 is associated with a media application program. The telephony window 506 is associated with a telephony application program. The inactivate window 508 is associated with an application program that is currently in the background, and is not the active application program. The active window 510 is associated with an application program that currently is in the foreground, and is the active application program. There also is a pointer 510, the movement of which within the screen 502 is caused by the user using a pointing device, such as the mouse device 112 (not shown).

Normally, the active application program associated with the active window 510 receives all input from input devices. That is, the program associated with the window 510 has overall focus, which is also referred to as keyboard focus. However, the media application program associated with the media window 504 has registered to receive input from media-related devices, even if the program is not the active application program. This means that the media application program has media focus, even if it does not have keyboard focus. Similarly, the telephony application program associated with the telephony window 506 has registered to receive input from telephony-related devices, even if the program is not the active application program. This means that the telephony application program has telephony focus, even if it does not have keyboard focus.

The application program associated with a background window 508 is an example of an inactive application program. Background application programs include any program that is not currently the active application program that has keyboard focus. In FIG. 5, such background application programs also include the media application program associated with the media window 504, and the telephony application program associated with the telephony window 506. Any background application program can receive pointing device focus, or mouse focus, when the pointer 510 is positioned over the window associated with the program. For example, the pointer 510 is positioned over the inactive window 508. If a button on the pointing device were pressed while the pointer 510 is positioned over this window, the application program associated with the window 508 would receive this input, because it currently has pointing device focus. It is noted that there are other ways to change focus than those described here.

Example Computerized Device

Figure 6:
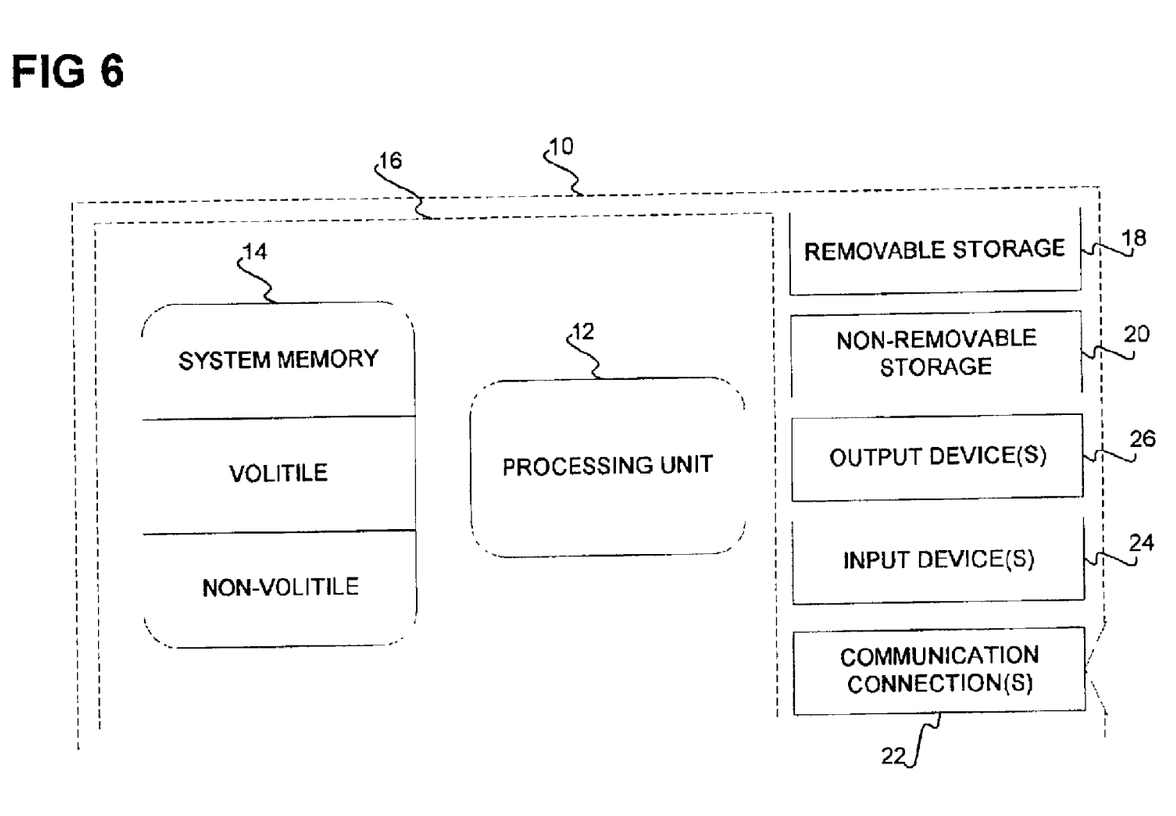
FIG. 6 is a diagram of an example computerized environment in conjunction with which the invention may be implemented.

FIG. 6 illustrates an example of a suitable computing system environment 10 on which the invention may be implemented. The computing system environment 10 is only one example of a suitable computing environment and is not intended to suggest any limitation as to the scope of use or functionality of the invention. Neither should the computing environment 10 be interpreted as having any dependency or requirement relating to any one or combination of components illustrated in the exemplary operating environment 10. In particular, the environment 10 is an example of a computerized device that can implement the invention as has been described.

The invention is operational with numerous other general purpose or special purpose computing system environments or configurations. Examples of well known computing systems, environments, and/or configurations that may be suitable for use with the invention include, but are not limited to, personal computers, server computers, handor laptop devices, multiprocessor systems, microprocessorsystems. Additional examples include set top boxes, programmable consumer electronics, network PCs, minicomputers, mainframe computers, distributed computing environments that include any of the above systems or devices, and the like.

The invention may be described in the general context of computerinstructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An exemplary system for implementing the invention includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.), or some combination of the two. This most basic configuration is illustrated by dashed line 16. Additionally, device 10 may also have additional features/functionality. For example, device 10 may also include additional storage (removable and/or non-removable) including, but not limited to, magnetic or optical disks or tape. Such additional storage is illustrated in by removable storage 18 and non-removable storage 20.

Computer storage media includes volatile, nonvolatile, removable, and non-removable media implemented in any method or technology for storage of information such as computer readable instructions, data structures, program modules, or other data. Memory 14, removable storage 18, and non-removable storage 20 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Communications connection(s) 22 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 24 such as keyboard, mouse, pen, voice input device, touch input device, etc. Output device(s) 26 such as a display, speakers, printer, etc. may also be included. All these devices are well know in the art and need not be discussed at length here.

The methods that have been described can be computer-implemented on the device 10. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

Conclusion

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A system provided on at least one computer readable medium executed within a computerized environment, the system comprising:

at least one non-serial input device driver being non legacy; wherein, each said non-serial input device driver corresponds to a non-serial input device being non legacy;

at least one serial input device driver being legacy; wherein, each said serial input device driver corresponds to a serial input device being legacy; and, a manager component, the manager component comprising, a process for receiving input from both the at least one non-serial input device driver and the at least one serial input device driver, and providing the input to one or more application programs; wherein, the one or more application programs receive the input from the non-serial input device without directly communicating with the at least one non-serial input device driver, and a device addition process to add additional serial input devices being legacy and additional non-serial input devices being non legacy, to the manager component; wherein, the device addition process registers the additional non-serial input devices to the manager component and skips the registration for the additional serial input devices.

2. The system of claim 1, wherein the manager component provides the input from the at least one non-serial input device driver according to a pre-existing manner in which the one or more application programs had previously received only the input from the at least one serial input device driver, the manager component leveraging the pre-existing manner for providing the input from the at least one serial input device driver.

3. The system of claim 1, wherein the manager component provides the input from the at least one non-serial input device driver and the at least one serial input device driver to the one or more application programs in an integrated manner, the one or more application programs receiving both the input from the at least one non-serial input device driver and the input from the at least one serial input device driver, through the manager component.

4. The system of claim 1, wherein the manager component provides the input from the at least one non-serial input device driver and the at least one serial input device driver to the one or more application programs in a manner by which new non-serial input devices and corresponding non-serial input device drivers are addable to the system without requiring revision of the manager component for the manager component to be able to provide input from the additional non-serial input devices.

5. The system of claim 1, wherein the manager component provides the input from the at least one non-serial input device driver and the at least one serial input device driver to the one or more application programs in a manner by which new non-serial input devices and corresponding non-serial input device drivers are addable to the system without requiring revision of the one or more application programs for the one or more application programs to be able to receive input from the additional non-serial input devices through the manager component.

6. The system of claim 1, wherein the one or more application programs include a media application program having media focus, the media application program receiving the input provided by the manager component that relates to media devices, regardless of whether the media application program currently has active focus as a foreground application program.

7. The system of claim 1, wherein the one or more application programs include a telephony application program having telephony focus, the telephony application program receiving the input provided by the manager component that relates to telephony devices, regardless of whether the telephony program currently has active focus as a foreground application program.

8. The system of claim 1, wherein the one or more application programs include an inactive application program having pointing device focus, the inactive application program receiving the input provided by the manager component that relates to pointing devices where the input coincides with the inactive application program, even though the inactive application program has inactive focus as a background application program.

9. The system of claim 1, further comprising an input queue for each of the one or more application programs, the manager component providing the input to the one or more application programs through the input queue for each application program.

10. A method for execution within a computerized environment, the method comprising:

provideing input by one or more non-serial input device drivers being non legacy, wherein said each non-serial input device driver corresponds to a non-serial input device being non legacy and providing input by one or more serial input device drivers being legacy, wherein said each serial input device driver corresponds to serial input device being legacy;

receiving the input from the one or more non-serial input device drivers and the input from the one or more serial input device drivers by a manager component; and, providing the input by the manager component to one or more application programs; wherein, the one or more application programs receive the input from the non-serial input devices without directly communicating with the one or more non-serial input device drivers, and providing an input manager device addition process to add at least one additional serial input device being legacy and at least one additional non-serial input device being non legacy, to the manager component; wherein, the device addition process registers the at least one additional non-serial input device to the manager component and skips the registration for the at least one additional serial input device.

11. The method of claim 10, wherein providing the input by the manager component to the one or more application programs comprises providing the input according to a pre-existing manner in which the one or more application programs had previously received only the input from the one or more serial input device drivers, the manager component leveraging the pre-existing manner for providing the input from the one or more serial input device drivers.

12. The method of claim 10, wherein providing the input by the manager component to the one or more application programs comprises providing the input in an integrated manner, the one or more application programs receiving the input from the one or more non-serial input device drivers through an identical process as the programs receive the input from the one or more serial input device drivers.

13. A computer-readable medium having instructions stored thereon for execution by a processor to perform a method comprising:

providing input by one or more non-serial input device drivers being non legacy, wherein said each non-serial input device driver corresponds to a non-serial input device being non legacy and providing input by one or more serial input device drivers being legacy, wherein said each serial input device driver corresponds to serial input device being legacy;

receiving the input from the one or more non-serial input device drivers and the input from the one or more serial input device drivers by a manager component; and, providing the input by the manager component to one or more application programs; wherein, the one or more application programs receive the input from the non-serial input devices without directly communicating with the one or more non-serial input device drivers, and providing an input manager device addition process to add at least one additional serial input device being legacy and at least one additional non-serial input device being non legacy, to the manager component; wherein, the device addition process registers the at least one additional non-serial input device to the manager component and skips the registration for the at least one additional serial input device.

14. The medium of claim 13, wherein providing the input to the one or more application programs comprises providing the input according to a pre-existing manner in which the one or more application programs had previously received only the input from the one or more serial input device drivers.

15. The medium of claim 13, wherein providing the input to the one or more application programs comprises providing the input in an integrated manner, the one or more application programs similarly receiving the input from the one or more non-legacy input drivers and from the one or more legacy input drivers.

* * * * *